United States Patent [19]
Siegers

[11] 3,875,053
[45] Apr. 1, 1975

[54] PROCESS FOR CARRYING OUT ION EXCHANGE AND ADSORPTION PROCESSES USING A COUNTERCURRENT VESSEL

[75] Inventor: Gunter Siegers, Schildgen, Germany

[73] Assignee: Bayer Aktiengesellschaft, Leverkusen, Germany

[22] Filed: Apr. 25, 1973

[21] Appl. No.: 354,627

[30] Foreign Application Priority Data
May 3, 1972   Germany.......................... 2221561

[52] U.S. Cl................ 210/35, 210/269, 210/285, 210/291
[51] Int. Cl............................................ B01d 15/06
[58] Field of Search....... 210/35, 279, 30, 275, 269, 210/285, 291

[56] References Cited
UNITED STATES PATENTS
| | | | |
|---|---|---|---|
| 2,855,364 | 10/1958 | Roberts................................ | 210/35 |
| 3,240,699 | 3/1966 | Duff et al............................. | 210/35 |
| 3,402,126 | 9/1968 | Cioffi.................................... | 210/35 |
| 3,687,843 | 8/1972 | Emmett......................... | 210/279 X |

FOREIGN PATENTS OR APPLICATIONS
| | | | |
|---|---|---|---|
| 2,017,131 | 10/1971 | Germany........................... | 210/279 |

*Primary Examiner*—Frank A. Spear, Jr.
*Assistant Examiner*—Ferris H. Lander
*Attorney, Agent, or Firm*—Burgess, Dinkage & Sprung

[57] ABSTRACT

Ion exchange and adsorption processes are carried out in a countercurrent vessel in which the washing liquid is purified in a covering layer situated on a partition in the vessel, which layer preferably consists of the same ion exchange material, before it enters the ion exchange mass.

2 Claims, 1 Drawing Figure

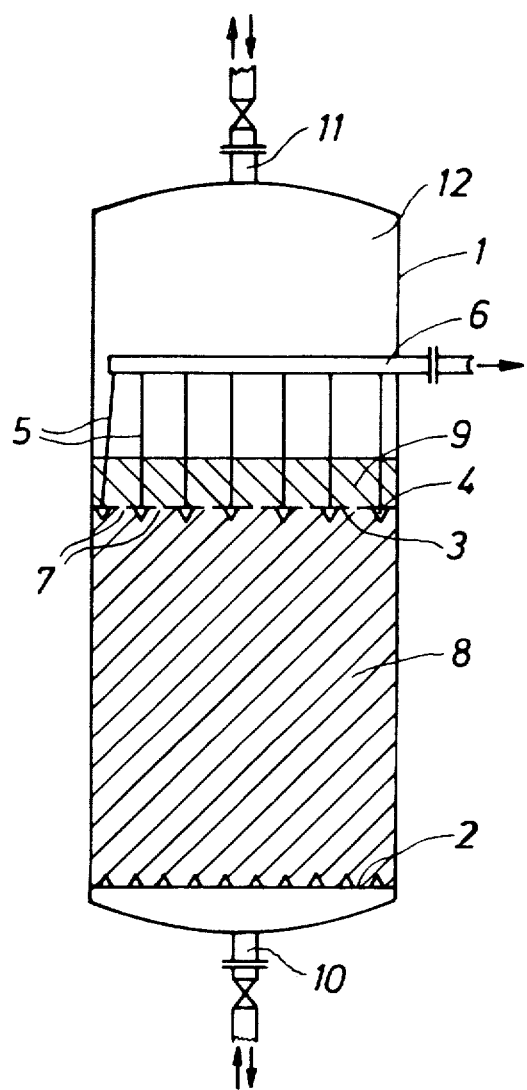

PROCESS FOR CARRYING OUT ION EXCHANGE AND ADSORPTION PROCESSES USING A COUNTERCURRENT VESSEL

This invention relates to a process for carrying out ion exchange and adsorption processes using a countercurrent vessel through which the liquid which is to be treated flows upwards, passing through an exchange material which is situated between a lower nozzle plate and a partition which is provided with both discharge and throughflow ducts while, in the regeneration phase, a regenerating liquid entering the upper part of the container flows downwards through the exchange material and in the back-wash phase the resin is flushed back upwards.

In all ion exchange systems operating by the countercurrent process it is important to prevent movement of the layer of ion exchange material.

In the vessel described above, no movement or shifting of the ion exchange material occurs if the space between the two nozzle plates is completely filled with ion exchange material and, in addition, resin in an amount of up to 50% of the quantity of active ion exchanger used is placed on the upper nozzle plate, in a so-called back flushing chamber arranged above it.

In other countercurrent systems shifting of the ionexchange material is prevented by exerting pressure on a covering layer placed on the exchange material while regenerating liquid is passed upwards. Dynamic or static techniques may be employed for this purpose; water or air may be used to apply pressure to the upper layer of the exchange material or closable nozzle plates or inflatable rubber bladders may be fitted.

According to another embodiment, the exchange material is placed between two nozzle plates and is pressed against the upper nozzle plate while the liquid which is to be treated flows through the apparatus.

When using the countercurrent system described above, however, the ion exchange material is forced upwards through apertures in the partition when the material is back-washed.

A common feature of all countercurrent processes is the fact that the liquid which is to be treated last contacts the exchanger layer which was the first to be in contact with the regenerating liquid during the preceding regeneration process and which therefore underwent the highest degree of regeneration.

The quality of the treated liquid depends mainly on the extent to which this uppermost layer is purified. For this reason, the regenerating liquid is rinsed out and displaced by a rinse liquid for example water, which is of at least equal purity with the preceding effluent of the exchange unit. If a rinse liquid of lower purity is used then the uppermost layer, the so-called polishing layer, is contaminated with a certain preliminary charge which has a damaging effect on the degree of purity of the liquid to be treated. This disadvantage is obviated by drawing the necessary rinse liquid from the reservior of treated liquid or from a purification plant working in parallel with the unit, which reservior must of course be sufficiently large.

It is an object of this invention to provide a process which does not require the use of treated liquid for rinsing the exchange material and in which it is no longer necessary to supply a rinse liquid of equal purity to the treated liquid.

The invention therefore provides a method for carrying out an ion exchange or adsorption process using a counter current vessel which vessel comprises a container, a lower plate provided with one or more nozzles and an upper plate which is provided with one or more throughflow apertures and one or more discharge tubes, in which container the space between said upper and said lower plates is filled with ion exchange material or adsorbent and the upper plate is covered with a layer of ion exchange material or adsorbent, which may be the same as or different from the material contained between the two plates, which method comprises an activation or regeneration phase in which the activating or regenerating liquid enters the container at the top and flows downwards through the covering layer and the material between the plates, a rinsing phase in which rinse liquid enters the container at the top and flows downwards through the container, thereby displacing the activating or regenerating liquid, and a treatment phase in which the liquid to be treated enters the container at the bottom flows upwards through the material located between the plates, leaving the container via said discharge tubes.

Another advantage of the process is that the fine particles of ion exchange material formed during operation of the vessel, which during the charging phase may cause considerable difficulties, such as increased pressure loss and flow obstructions, if subjected to liquids flowing at high velocities, need only be removed if their volume exceeds the quantity of covering layer situated above the partition. No hydrodynamic difficulties are to be expected in the regeneration phase in which the flow is directed downwards at very much lower velocities. It is sufficient if, in the course of the back flushing operations which are periodically required, the fine particles are transported from the part of the filter bed which is active during the charging phase into the space situated above the perforated partition. In that situation, the fine particles replace the intact or suitably sized ion exchange particles which inevitably fall into the region between the two nozzle plates where they actively take part in the ion exchange process.

The quantity of ion exchanger which constitutes the covering layer above the perforated partition must be such that when the rinse water for the mass resin which is active during the charging phase passes through it, it will never be completely charged. The quantity of covering layer on the partition is preferably 5 to 50% by volume of the active ion exchanger mass. A countercurrent system suitable for the process is shown purely diagrammatically in the accompanying drawing and its mode of operation is described below.

The countercurrent vessel consists of a container (1) having a lower nozzle plate (2). About half way up the container (1) is a partition (3) with individual nozzles (4) from which discharge tubes (5) are connected to a discharge pipe (6) which leads to the outside. In addition, the partition (3) has flowthrough apertures (7). The space between the nozzle plate (2) and partition (3) is completely filled with ion exchange material (8). A covering layer (9) is situated on the partition (3). In addition, the container (1) has an inlet and outlet aperture (10) at the bottom and (11) at the top.

During the back washing process, the back washing liquid enters container (1) through the pipe (10) below the nozzle plate (2) and is distributed over the cross-section of container (1) through the nozzle plate (2)

before entering the ion exchange material (8). The liquid raises the exchange material (8) which is thereby partly forced through the apertures (7) of partition (3) into the space (12) above it. The back-washing liquid leaves the container (1) through the opening (11). The nozzles (4) of the partition (3) and the main conduit (6) are closed during this phase. After completion of the back-washing process, the ion exchange material (8) returns through the apertures (7) to settle at its previous level. During this process, the fine particles from the region of active ion exchange material 8) are replaced by coarser material from the inactive covering layer (9) situated above the partition (3).

During the regeneration process, the regenerating liquid enters the upper part of the container through the opening (11) and flows downwards first through covering layer (9) and then through the ion exchange material (8) and finally leaves the container (1) through the opening (10) at the bottom of the container.

After the regeneration process, the regenerating liquid must be rinsed out of the ion exchange material (8) and displaced. The rinse liquid required for this operation also enters the top of the container (1) through the inlet opening (11) to reach the covering layer (9). Since, as already mentioned above, it is permissible to use a quality of rinse liquid similar to that of the liquid which is to be purified, the ion exchange material (8) on the surface of the covering layer (9) becomes partly charged to an extent which depends on the volume of rinse liquid and the concentration of ions in it. For washing the active ion exchanger, it is sufficient to use 2 to 4 times the volume of the active exchanger between the lower and upper plates.

Consequently, only a relatively small part of the covering layer (9), directly on its surface, becomes charged. Since that part of the exchange material (8) which is adjacent to the covering layer (9) only comes into contact with already purified rinse water during the rinsing phase, there is no possibility of a preliminary charge influencing the subsequent quality of the filtrate.

The solution which is to be purified is introduced into the container (1) through the inlet opening (10) during the subsequent charging phase, flows through the lower nozzle plate (2) and ion exchange material (8) and enters the nozzle (4) of the partition (3) to leave the container (1) through the duct (5) and main conduit (6). During this process, the opening (11) remains closed.

EXAMPLE 1

To remove the cations from a solution, a total 119 liters of an ion exchanger which had been prepared by sulfonating polystyrene cross-linked with divinyl benzene was introduced into a cylindrical container. 20 liters of the aforesaid 119 liters of cation exchanger were situated as covering layer above the perforated nozzle plate. The remaining 99 liters took part in the ion exchange process. The countercurrent filter had a diameter of 300 mm and the cylindrical part had a total height of 2400 mm. As indicated in the accompanying drawing, the container contained a nozzle plate (2) at the lower end and, 1400 mm above it, a second nozzle plate (3), which immediately around each nozzle was provided with flowthrough apertures (4) 15 mm in diameter for the throughflow of the ion exchanger. Each of the nozzle plates had seven filter nozzles (100 nozzles per m²)

For the regeneration process, the regenerating acid entered the container (1) through the pipe (11) passed first through the covering layer (9) and then through the apertures on the perforated nozzle plate (3) through which ion exchange material passes in the back-washing phase, then through the active resin material (8) which such was regenerated and then through the lower nozzle plate (2), finally leaving the filter (1) through pipe (10). The untreated water used for displacing and rinsing away the regenerating acid took the same path.

147 Val of hydrochloric acid (1.48 Val/l of active exchanger) at a concentration of 1.1 Val/l of solution were filtered through all the ion exchange material in the container within 22 minutes in the manner indicated above. 232 liters of untreated water having a cation content of 9.3 mVal per liters (38.7% $Na^+$, 46% $Ca^{++}$ and 15.3% $Mg^{++}$) were required for displacing and rinsing the acid.

During the subsequent exhaustion with water of the above composition, 12.8 m³ could be completely freed from cations, the water entering the container (1) through the opening (10) at the rate of 2.5 m³/hour and flowing through the ion exchange material (8) and nozzles (4) of the partition (3) to leave the filter in a purified state through the conduit (5) and main pipe (6).

The effluent from a strongly basic ion exchanger connected to the downflow end of the above mentioned filter was found to have an average conductivity of 2.98 microsiemens/cm. The water flow through the cation exchanger was stopped when the conductivity was 15 microsiemens/cm.

The same output, namely 12.79 m³ of pure water with an average conductivity of 3.11 microsiemens/cm, was measured in an experiment which differed from the preceding experiment in the rinsing process but was identical in every other respect. 225 liters of demineralized water entering through the main pipe (6), conduits (5) and nozzles (4) were used for rinsing. In yet another experiment which was carried out after regeneration and rinsing with untreated water and in which both regenerating solution and rinse water were introduced through the main pipe (6) and discharged through the opening (7) at the bottom of the container, subsequent treatment with untreated water of the above composition yielded only 12.4 m³ of pure water. The effluent of a strongly basic anion exchanger was found to have an average conductivity of 35.4 microsiemens per cm. The water flow was in this case stopped at 50 microsiemens because values below 15 microsiemens/cm could not be achieved.

EXAMPLE 2

A total of 950 liters of an anion exchange material prepared by introducing dimethyl-ethanolamine groups into polystyrene cross-linked with divinyl benzene were introduced into a cylindrical ion exchanger vessel (1) which had a diameter of 820 mm and a total cylindrical height of 2500 mm and which contained a nozzle plate (2) with filter nozzles (4) at the lower end and, 1500 mm above it, a perforated partition (3) also provided with filter nozzles (4). The nozzle plate and partition were provided with 52 filter nozzles each. Four flow-through apertures (7) with a diameter of 18 mm for passage of the ion exchanger material (8) were uniformly positioned about each nozzle (4) of partition (3). Each nozzle (4) of partition (3) was connected to a main pipe (6) through conduits (5).

The 792 liters of ion exchange material (8) situated between the lower nozzle plate (2) and partition (3) were used for the actual operating process. The remaining 158 litres formed a 30 cm high layer (9) above the perforated partition (3). The remaining space (12) above filter layer (9), which had a cylindrical height of about 800 mm, was used for the back washing process.

Sodium hydroxide solution used for the process of regeneration entered through the opening (11) to flow through the layer (9) and ion exchange material (8) and was discharged through the opening (10). The water used for rinsing and displacement of the regenerating liquid, which was supplied from an adjacent cation exchanger vessel in which untreated water was passed through resin charged with $H^+$ ions, subsequently flowed along the same path.

After regeneration with 750 Val of NaOH at a concentration 0.5 Val/l of solution and rinsing until the conductivity was reduced to 30 $\mu$S/cm, which required 2620 l of the effluent from an adjacent cation exchanger, the filter was charged with decationized water of the following composition:

| Cl | 4.3 mval/l; | $SO_4^{--}$ | 1.61 mval/l; |
|---|---|---|---|
| $CO_2$ | 0.23 mval/l; | $SiO_2$ | 0.117 mval/l. |

101.5 m³ of water could be purified before the exhaustion of the resin, which was indicated by silicic acid break through. The average residual $SiO_2$ content during the whole loading process was 0.021 mg/l.

A subsequent experiment which differed from the one described above only in that demineralized water was used for displacing and rinsing the regenerating liquor gave practically the same results, namely an output of 102.0 m³ and a residual $SiO_2$ content of 0.023 mg/l.

A further experiment which was carried out after regeneration and rinsing with cation exchanger effluent and in which both liquids were introduced backwards through the main pipe (6) and discharged through the opening (10) yielded distinctly inferior results, namely an output of only 97.1 m³ and an average residual $SiO_2$ content of 0.0096 mg/l.

We claim:

1. A method for carrying out ion exchange or adsorption employing a container provided with inlet-and-outlet tubes adjacent the top and bottom, an intermediate inlet-and-outlet tube, and a lower plate for retaining solid ion exchange or adsorption material while permitting passage of liquid, comprising filling said container with ion exchange or adsorption material to a level above the level of communication between the container and the intermediate tube, so as to form an active layer of material extending from the container bottom to said intermediate tube communication level surmounted by a covering layer of material above said intermediate tube communication level, passing activating or regenerating liquid from said top tube downwardly through all said material and out said bottom tube, passing sufficient untreated liquid to serve as a rinse liquid from said top tube downwardly to displace substantialaly all of said activating or regenerating liquid, passing liquid to be treated upwardly from said bottom tube and out said intermediate tube without backing up into said covering layer until the capacity of the ion exchange or adsorption material is significantly diminished, and then repeating the sequence of steps.

2. A method as claimed in claim 1 in which the volume of the covering layer is between 5% and 50% of the volume of the active layer of material.

* * * * *